United States Patent [19]
Rockstroh et al.

[11] Patent Number: 5,177,756
[45] Date of Patent: Jan. 5, 1993

[54] LASER APPARATUS INCLUDING CRYSTAL PROTECTION CIRCUITRY AND METHOD OF OPERATION THEREOF

[75] Inventors: Todd J. Rockstroh, Maineville, Ohio; James G. Kelley, California, Ky.; Ralph M. Somers, Cincinnati, Ohio; John N. Minnich, Cincinnati, Ohio; Seetha Ramiah Mannava, Cincinnati, Ohio

[73] Assignee: General Electric Company, Cincinnati, Ohio

[21] Appl. No.: 733,521

[22] Filed: Jul. 22, 1991

[51] Int. Cl.⁵ ............................... H01S 3/00
[52] U.S. Cl. .............................. 372/38; 372/35; 372/29; 372/25; 372/33
[58] Field of Search ............... 372/35, 29, 38, 25, 372/33

[56] References Cited
U.S. PATENT DOCUMENTS 4,950,268 8/1990 Rink ........................... 372/25
5,018,152 5/1991 Linne et al. .................. 372/25

Primary Examiner—Léon Scott, Jr.
Attorney, Agent, or Firm—Jerome C. Squillaro; Charles L. Moore, Jr.

[57] ABSTRACT

A laser apparatus is disclosed which is capable of protecting the laser slab or rod crystal within the laser from damage due to overheating when the laser malfunctions in a manner such that laser output ceases while optical pumping of the laser crystal continues. The laser apparatus includes a laser crystal situated within a laser cavity. The apparatus also includes an excitation lamp for pumping the crystal to generate a laser beam to project along a desired main path. A first sensor senses the cessation of the projection of the laser beam along the desired main path and a second sensor senses the continuing excitation of the excitation lamp. The apparatus further includes a extinguishing circuit for extinguishing the excitation lamp a predetermined amount of time after the cessation of the laser beam such that damage to the laser apparatus due to overheating is avoided.

14 Claims, 3 Drawing Sheets

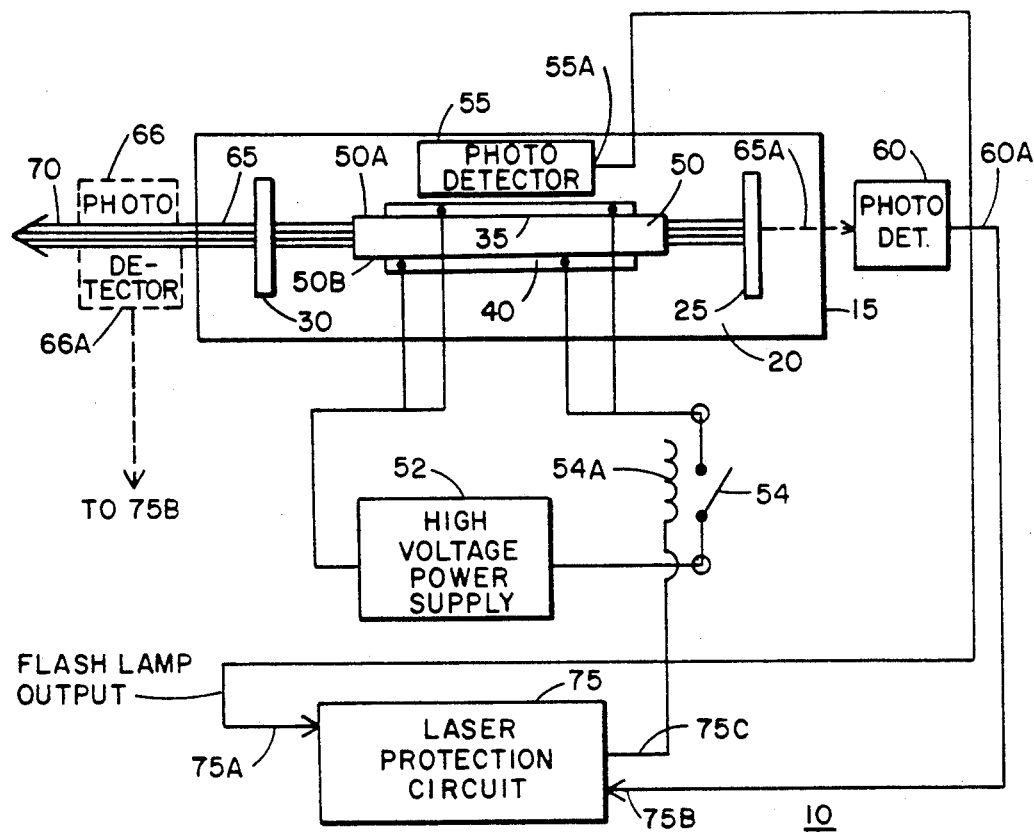
FIG. 1
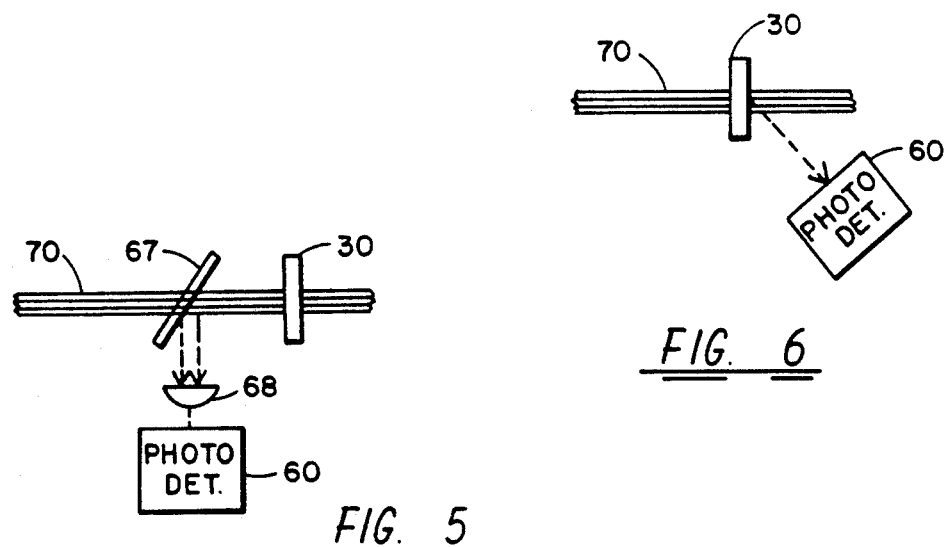
FIG. 5
FIG. 6

LASER APPARATUS INCLUDING CRYSTAL PROTECTION CIRCUITRY AND METHOD OF OPERATION THEREOF

BACKGROUND OF THE INVENTION

The government has rights in this invention pursuant to Contract No. F33657-83-C-0281 awarded by the Department of the Air Force.

This invention relates in general to laser devices and, more particularly, to laser systems incorporating circuitry for preventing damage to the laser when certain undesired operating conditions are encountered.

Laser devices have many useful applications such as cutting, welding, drilling, and soldering as well as other applications useful in materials processing. Depending on the particular application, the average power of the laser can range from approximately one watt to several hundred watts. Accordingly, it is important that undesired heat not be permitted to build up in such lasers especially in the case of higher power lasers.

Solid state lasers such as Nd:YAG rod and slab lasers employed for industrial drilling and cutting are usually energized or pumped using excitation lamps commonly referred to as flash lamps. These flash lamps are situated within the laser head and are typically coupled to a high energy power supply. The laser head includes an optical cavity having a nearly 100% reflecting mirror at one end and a partially reflecting output mirror at the other. A laser slab or rod is situated within the optical cavity. A typical slab or rod crystal exhibits a rectangular cross-section and includes six surfaces, namely, opposed pumping surfaces, opposed cooling surfaces, and respective ends.

The energy supplied by the flash lamps is converted by the slab or rod crystal to energy of a specific frequency. The slab or crystal is cooled by flowing coolant along the crystal cooling surfaces. Laser slab crystals typically have two surfaces which are finished to the Brewster's angle.

The optical cavity accumulates the energy supplied by the flash lamps until desired levels are achieved and then releases the energy in the form of laser light. The light is actually stored within the optical cavity by being bounced between the aforementioned mirrors in oscillatory fashion. When the laser device is operated as a laser resonator, a laser beam is emitted from one of the finished surfaces of the crystal.

If the optical path between the two mirrors becomes blocked or if one of the mirrors becomes damaged, the oscillation within the laser cavity may cease. This results in no laser power being emitted through the output mirror. If the flash lamps then continue to supply energy to the slab or rod crystal while the crystal is not lasing, heat then undesirably builds up in the slab within the optical cavity. This build-up of heat or other forms of energy in the slab can lead to catastrophic failure at the ends of the slab. While the slab can generally be refurbished after the resultant heat damage, such refurbishment is a very expensive proposition and results in the laser being inoperative for an extended period of time.

SUMMARY OF THE INVENTION

Accordingly, one object of the present invention is to provide a laser apparatus which is protected from the overheating which can result when the laser beam fails while the flash lamps continue to pump the laser crystal.

Another object of the present invention is to provide an apparatus and method for permitting a laser apparatus to have a controlled shut-down when lasing ceases due to a laser defect.

Yet another object of the present invention is to provide a laser apparatus and method of operation thereof which avoids the necessity for continued laser slab crystal refurbishing and the attendant significant expense.

Still another object of the present invention is to provide a laser apparatus and method of operation thereof which decreases the number of times that the laser apparatus is out of service.

In accordance with the present invention, a laser apparatus is provided including a laser crystal situated within a laser cavity and an excitation lamp for pumping the crystal to generate a laser beam projecting along a desired main path. The laser apparatus further includes a first sensor for sensing cessation of the projection of the laser beam along the desired main path and a second sensor for sensing the excitation of the excitation lamp. The apparatus of the invention also includes an extinguishing circuit, coupled to the excitation lamp and the first and second sensors, for extinguishing the excitation lamp a predetermined amount of time after the cessation of the laser beam such that damage to the laser apparatus due to overheating is avoided.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

FIG. 1 is a block diagram of the laser apparatus of the present invention;

FIGS. 5 and 6 show alternate embodiments of the photodetector arrangement.

DETAILED DESCRIPTION OF THE INVENTION

Figure 2:
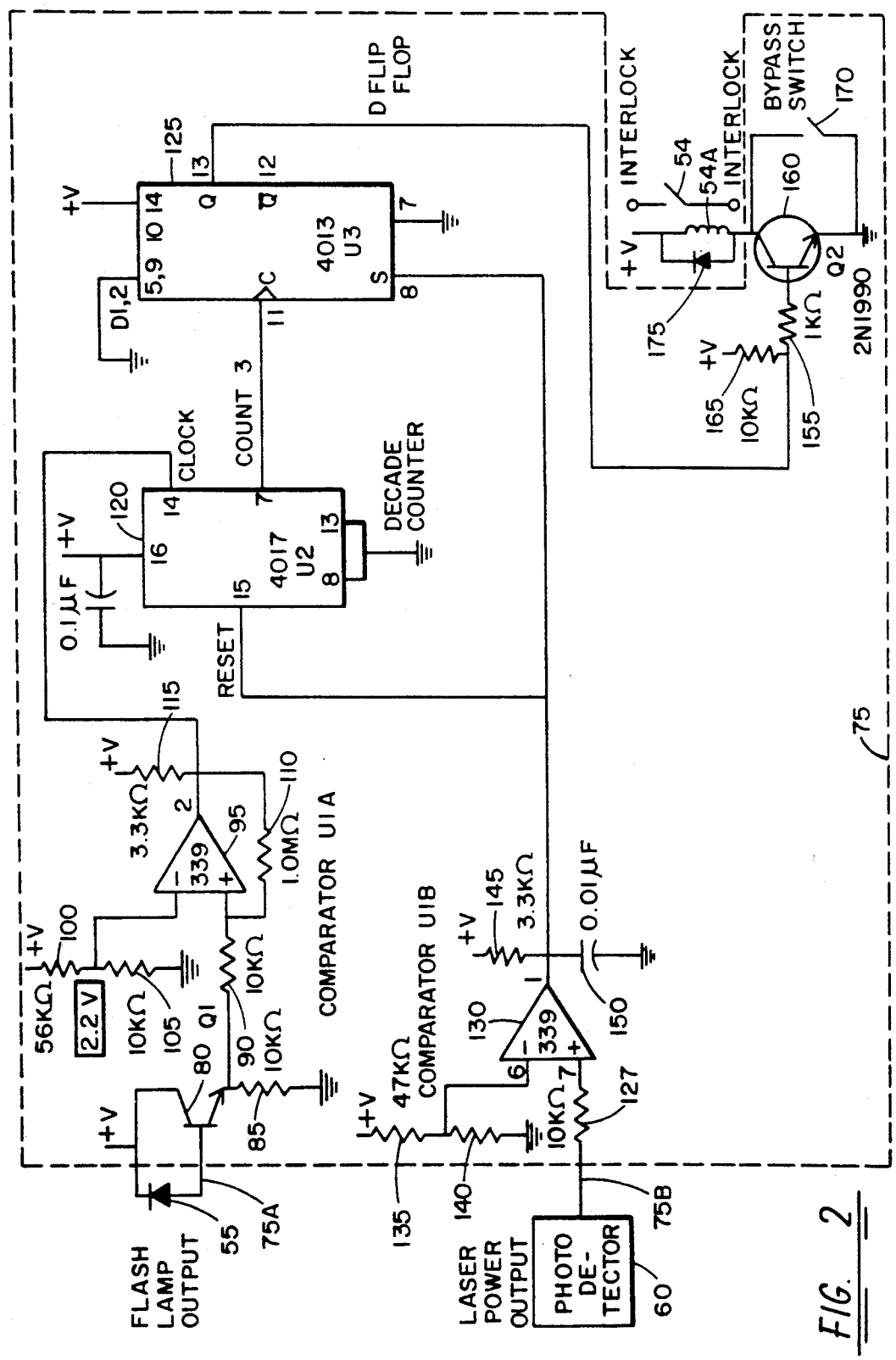
FIG. 2 is a detailed schematic circuit diagram of the protection circuit employed in the laser apparatus of FIG. 1.

FIG. 1 shows a simplified block diagram representation of a laser apparatus 10 incorporating the failure protective circuitry of the present invention. Laser 10 includes a head 15 having an optical chamber or cavity 20 therein. A substantially completely reflective mirror 25 is situated at one end of cavity 20 and a partially reflective mirror 30 is situated at the remaining end of cavity 20. Excitation lamps or flash lamps 35 and 40 are disposed on opposed major surfaces 50A and 50B, respectively, of laser slab crystal 50. A high voltage power supply 52 is coupled to flash lamps 35 and 40 to provide a source of excitation energy thereto. An interlock relay 54 is situated in the supply path from power supply 52 to flash lamps 35 and 40 as shown in FIG. 1.

The operation of relay 54 will be discussed later in more detail.

A photodetector 55 senses the presence of the high intensity light signal generated by flash lamps 35 and 40. Photodetector 55 includes an output 55A. A photodetector 60 senses the generation of a desired main laser beam component 65 along a desired main laser path 70 generally parallel to laser slab 50 and extending from one end thereof as indicated in FIG. 1. Photodetector 60 includes an output 60A. Photodetectors 55 and 60 may be photo-diodes or phototransistors, for example.

In a preferred embodiment, the detector 60 is positioned behind mirror 25 and is responsive to leakage light 65A passing through the mirror 25. Although mirror 25 is classified as 100% reflective, about 0.01% of the beam 65 actually leaks through mirror 25. This embodiment is desirable since it allows laser beam detection without interference with the beam 65. An alternate embodiment, indicated in phantom lines at 66, positions a photodetector adjacent the main beam path 70. A signal from detector 66 is coupled via line 66A to input 75B.

Referring briefly to FIG. 5, another embodiment of detector arrangement is shown in which a flat quartz plate 67 is positioned in beam path 70. A small amount of Fresnel reflection from plate 67 is gathered by lens 68 and directed to photodetector 60. FIG. 6 represents still another embodiment in which detector 60 is positioned to detect low level scattered laser radiation from mirror 30. It will be appreciated that the detector 60 could be positioned at any non-interfering location in the system at which scattered radiation can be detected, such as adjacent any mirror or resonator.

It is noted that in addition to the aforementioned main laser beam component 65, laser apparatus 10 can also generate undesired radial components (not shown) substantially perpendicular to main laser component 65 when laser apparatus 10 is malfunctioning. It is again noted that photodetector 60 senses the desired main laser component 65 and provides indicia of that component to photodetector output 65A.

Photodetector output 55A is coupled to a first input 75A of a laser output malfunction detection and protection circuit 75 which will be subsequently referred to as protection circuit 75. Photodetector output 60A is coupled to a second input 75B of protection circuit 75. The output 75C of protection circuit 75 is coupled to relay 54 to enable protection circuit 75 to interrupt the high voltage supply 52 to flash lamps 35 and 40 thus causing laser 10 to shut down when certain laser operating conditions, later discussed, are encountered.

Protection circuit 75 senses when optical cavity 20 does not lase in response to light energy provided by flash lamps 35 and 40. Typical causes for such failure to lase are damaged mirrors, misalignment of the various laser components, water/gasket leakage or a blockage of the path between the mirrors. If cavity 20 fails to lase for greater than a predetermined amount of time and if flash lamps 35 and 40 are continuing to pump slab 50, then protection circuit 75 generates a shut-down signal at output 75C which actuates relay 54 to interrupt the power supply path to the flash lamps thus shutting down laser 10. Heat damage to laser slab 50 is thus prevented.

More particularly, FIG. 2 shows a schematic diagram of one embodiment of protection circuit 75. A description of the structure and components of protection circuit 75 is now given followed by a discussion of the operation thereof.

1. STRUCTURE AND COMPONENTS OF PROTECTION CIRCUIT 75

The flash lamp output signal sensed by photodetector 55 (FIG. 1) is provided to laser protection circuit input 75A of FIG. 2. The main desired laser output signal sensed by photodetector 60 (FIG. 1) is provided to laser protection circuit input 75B of FIG. 2.

As seen in FIG. 2, the cathode of photodetector diode 55 is coupled to the collector of an amplifier transistor 80 (Q1) and a source of positive DC voltage (+V). The anode of photodetector diode 55 is coupled to the base of transistor 80. The emitter of transistor 80 is connected to ground via a 10 Kohm resistor 85 and via a 10 Kohm resistor 90 to the positive input of a two input comparator 90, such as a conventional Type 339 comparator, for example. In this manner, the flash lamp output signal is supplied to protection circuit 75, amplified by amplifier transistor 80, and provided to comparator 95. The negative input of comparator 95 is coupled to a voltage divider formed by resistor 100 (56 Kohm) and resistor 105 (10 Kohm) connected as shown in FIG. 2. The output of comparator 95 is coupled back to the positive input of comparator 95 by a feedback resistor 110 (1.0 Mohms). The output of comparator 95 is coupled to a source of DC voltage (+V) by a resistor 115 (3.3 Kohms). Comparator 95 provides a positive pulse at the voltage supply level, +V, whenever amplifier 80 receives a flash lamp signal from photodetector diode 55.

The output of comparator 95 is coupled to the CLOCK input of a type 4017 decade counter as shown in FIG. 2. The COUNT 3 output of decade counter 120 is coupled to the clock input, C, of a D flip flop 125. The D1 and D2 data inputs of D flip flop 125 are coupled to ground (or low).

The laser output power signal at input 75B is supplied through a 10 Kohm resistor 127 to the positive input of a Type 339 comparator, 130. The negative input of comparator 130 is coupled to a voltage divider formed by resistor 135 (47 Kohm) and resistor 140 as seen in FIG. 2. The output of comparator 130 is coupled to a source of DC voltage, +V, via a resistor 145 (3.3 Kohm) and to ground by a 0.01 uF bypass capacitor 150. Resistor 145 and capacitor 150 force a reset when the power is turned on. Thus, whenever the laser output signal is present at input 75B, a corresponding signal is generated at the output of comparator 130 to indicate that presence. The output of comparator 130 is coupled to the RESET input of decade counter 120 and to the SET input, S, of D flip flop 125. The operation of the comparators 100 and 130, decade counter 120, and D flip flop 125, which cooperate to determine when relay 54 is actuated to shut down operation of laser 10, will be discussed later in detail.

The Q output of D flip flop 125 is coupled via a 1 Kohm resistor 155 to the base of a transistor 160, Q2. The Q output of D flip flop 125 is also coupled via a 10 Kohm resistor 165 to a source of DC voltage, +V. The emitter of transistor 160 is coupled to ground and via a bypass switch 170 back to the collector of transistor 160. The collector of transistor 160 is also coupled via the energization coil 54A of relay 54 to a source of DC voltage, +V. A diode 175 is coupled in parallel with energization coil 54A as shown in FIG. 2. Comparators 100 and 130, decade counter 120, and D flip flop 125 cooperate to determine under which laser malfunction conditions to issue a signal to switching transistor 160 to activate relay 54 to interrupt power to flash lamps 35 and 40. This action effectively shuts down laser 10 and prevents heat damage thereto.

II. THE OPERATION OF PROTECTION CIRCUIT 75

It is noted that in this particular embodiment of the invention, flash lamps 35 and 40 are excited by high voltage power supply 52 with a series of pulses to cause flash lamps to generate a series of light pulses which pump slab 50. A laser operating in this mode is referred to as a pulsed laser or a pulsed mode laser. When the flash lamps are continuously pumped, a laser is referred to as a continuous mode laser.

Light pulses from flash lamps 35 and 40 cause transistor 80 to conduct. This action drives comparator 95 to produce a positive pulse at the supply voltage level (+V) for each light pulse. The series of positive pulses thus generated acts as a clocking signal for decade counter 120. Decade counter 120 includes a series of count outputs designated count 1, count 2, count 3, . . . count 9 (of which only count 3 is shown in FIG. 2). With each clock pulse supplied to the CLOCK input of decade counter 120, a positive pulse is outputted on one of count outputs count 1, count 2 . . . count 9. In this particular embodiment, the output corresponding to the third clock input following a reset (namely, the count 3 output) is coupled to the clock input, C, of D flip flop 125. As will be seen later, the third clock output of decade counter 120 was selected to provide reasonably fast protection from overheating while avoiding a high false alarm rate.

It is noted that as long as laser 10 is successfully firing, that is, producing a series of desired main laser beam light pulses along path 70, such pulses are sensed by photodetector 60 and are used to continuously reset decade counter 120 to zero and to continually set D flip flop 125 to the set state of Q=1 or high. Under these desirable operating conditions wherein both the desired main laser beam output is present and flash lamps 35 and 40 are on, decade counter 120 is not permitted to count up to 3. Thus, D flip flop output Q is always high under these desirable operating conditions and relay 54 is always energized to permit laser 10 to remain operative.

However, if the generation of the series of laser light output pulses undesirably ceases while the flash lamps remain on, then the output of comparator 130 goes to zero. In this malfunction scenario, there is no longer a reset signal which would continually reset decade counter 120 to zero. Thus, decade counter 120 starts to count up and once it reaches 3 (corresponding to 3 flash lamp pulses after the main laser output has ceased), then D flip flop 125 is clocked at its C input thus causing the data input value of D=0 to be transferred to the output of D flip flop 125. Thus, in the case of such a malfunction where the laser main output ceases for a period of time corresponding to 3 flash lamp flashes or more, then the output of D flip flop 125 transitions from high to low. This in turn causes transistor 160 to go non-conductive and causes relay to open and interrupt power from high voltage power supply 52 to the laser. Laser 10 thus safely ceases operating when such a malfunction is encountered.

Stated alternatively, reset pulses are generated in response to the laser light pulses contained in the laser output power signal provided to comparator 130 by photodetector 60. Each time a reset pulse is supplied to the reset line of decade counter 120, counter 120 is reset to zero. Comparator 130 shapes the pulses and converts them to logic levels compatible with the decade counter 120 and the D flip flop 125. Flip flop 125 changes output state Q from high to low when a clock pulse is permitted to be present on its clock input C. The Q output of D flip flop 125 is forced into a high state by a positive pulse on the set terminal, S, thereof. The set pulse which is provided when laser output power is present overrides any input on the clock line, C, to D flip flop 125 and forces the Q output to go high. A continued series of set pulses, such as occurs when the main desired laser light output continues to be generated, will keep D flip flop 125 in a Q=high state. When the Q output of D flip flop 125 is high, then transistor 125 is conductive and relay 54 is energized. Energizing relay 54 closes the interlock line for laser high voltage power supply 52 and permits the operator to run the laser. If the interlock is opened for any reason, power supply 52 will be shut off and laser operation will cease. Bypass switch 170 may be used by the operator to energize the relay so that laser 10 can still be operated in the event of a sensor failure by either photodetector 55 or photodetector 60. After protection circuit 75 has been tripped, it can be reset by supplying an input to comparator 130 or by turning the power (V+) to protection circuit 75 off and on. The power on reset is forced by the circuit elements resistor 145 and capacitor 150.

While in the particular embodiment of the invention discussed above, the passage of a plurality (three) pulses of flash lamp light after cessation of the desired main laser beam was selected as an appropriate time for laser shut down, laser shut down may also be induced at a time corresponding to fewer than three pulses, for example, after two pulses of the flash lamps have occurred after cessation of the main laser beam.

To achieve this implementation, the "count 2" output of decade counter 120 would be coupled to the clock input, C, of D flip flop 125. It is noted however that the lower the selected number of flash lamp pulses employed as a trigger point for laser shut down, the higher the falsing rate (premature laser shutdown rate) becomes. The trigger point for laser shutdown may be selected to be a plurality of flash lamp light pulses in excess of three pulses after cessation of the main laser output, providing the number of pulses selected does not delay laser shut down for a period of time so long that significant heating and damage of the laser slab crystal results.

Figures 3, 4:
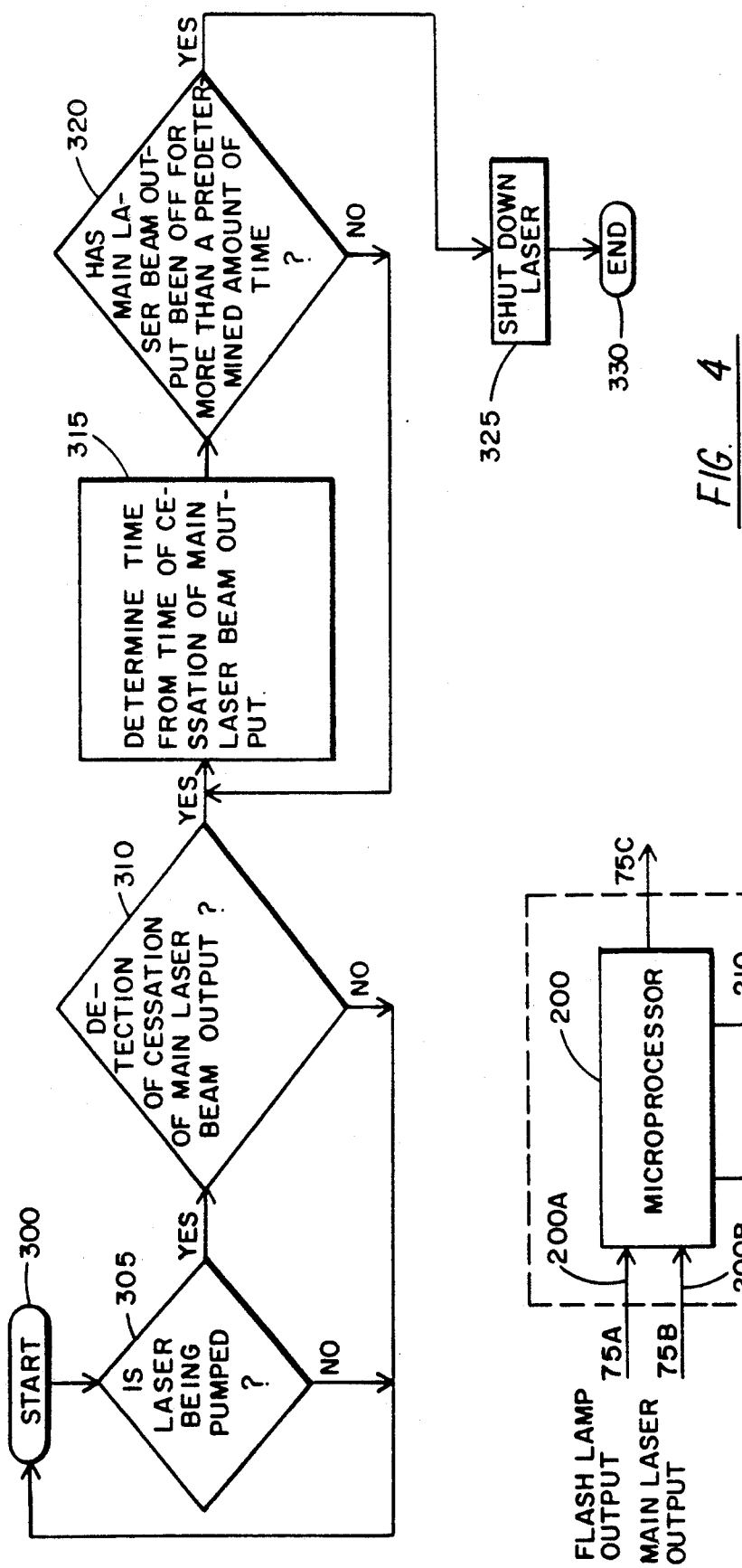
FIG. 3 is a simplified block diagram of a microprocessor based embodiment of the protection circuit employed in the laser apparatus of FIG. 1.
FIG. 4 is a flow chart depicting the steps of the present invention which are implemented by the protection circuit of FIG. 3 in cooperation with the laser apparatus of FIG. 1.

FIG. 3 shows an alternative embodiment of protection circuit 75 in which protection circuit 75 is implemented by a microprocessor. The embodiment of FIG. 3 is an embodiment simplified for illustration purposes. This embodiment includes a microprocessor 200 which in actual practice may be the same microprocessor or microcontroller used as the controller (not shown) for laser 10. A read only memory (ROM) 205 is coupled to microprocessor 200 to provide permanent storage therefor. A random access memory 210 is coupled to microprocessor 200 to provide temporary storage therefor. Depending on the particular configuration selected for microprocessor 200, a control program which governs the operation of microprocessor 200 in implementing the method of the present invention may be stored in either ROM 205 or RAM 210.

The flash lamp output signal is provided to microprocessor input 200A and the desired main laser beam output signal is provided to microprocessor input 200B. Those skilled in the art will appreciate that, in actual practice, the flash lamp output signal and the desired main laser beam output signal would be sensed and provided to microprocessor 200 in digital format by appropriate input circuits resident on a conventional input/output (I/O) bus (not shown) coupled to microprocessor 200. Microprocessor 200 processes the flash lamp output signal and the desired main laser beam output signal in accordance with the process steps specified in part by the control program resident in RAM 210. Microprocessor 200 then determines whether it is appropriate to shut down laser 10 or to permit laser 10 to continue operating depending on the present state of the flash lamp output signal and the desired main laser beam output signal. If it is determined that the flash lamp output signal is still pumping the laser slab crystal and that the desired main laser beam output signal has ceased for more than a predetermined period of time, then microprocessor 200 generates a "shut down" signal at output 75C. Otherwise, microprocessor 200 generates a signal at output 75C which permits laser 10 to continue operating. Those skilled in the art will appreciate that, in actual practice, the "shut down" signal generated by microprocessor 200 will be supplied to the I/O bus (not shown) and further processed by an appropriate conventional output circuit before being applied to relay 54.

To carry out the method of the present invention, the control program which is loaded in RAM 210 causes microprocessor 200 to carry out the steps indicated in the flowchart of FIG. 4 which is now described. The method of the invention starts at block 300 at which microprocessor 200 is initialized. The method continues by conducting a test at decision block 305 to determine if laser 10 is presently being pumped by flash lamps 35 and 40. If laser 10 is not presently being pumped, then flow continues back to starting block 300. However, if it is determined that laser 10 is presently being pumped, then flow continues to decision block 310 at which a test is conducted to determine if cessation of the desired main laser beam output has been detected. If not, then flow continues back to start block 300. However, if cessation of the desired main laser beam output has been detected, then flow continues to block 315 at which the time which has lapsed from cessation of the desired main laser beam output is counted or otherwise determined. Process flow then continues to decision block 320 at which a test is conducted to determine if the desired main laser beam output has been off for more than a predetermined amount of time. If not, then flow continues back to block 315. However, if it is found that the desired main laser beam output has been off for more than a predetermined amount of time, then the laser shuts down as per block 325 and the process ends at block 330.

While an apparatus for protecting a laser from overheating under certain operating conditions has been described above, it is clear that a method of operating that laser apparatus has also been described. In summary, the disclosed method involves protecting a laser apparatus from damage, such laser apparatus including a laser crystal situated within a laser cavity and further including an excitation lamp for pumping the crystal to generate a laser beam. The method includes the step of generating, by the apparatus, of a desired main laser beam in response to excitation of the laser crystal by the excitation lamp. The method further includes the step of sensing, by the apparatus, of the cessation of the desired main laser beam. The method also includes the steps of sensing, by the apparatus, of the continuing excitation of the excitation lamp, and extinguishing the excitation lamp a predetermined amount of time after the cessation of the laser beam such that damage to the laser apparatus due to overheating is avoided.

The foregoing describes an apparatus and method for protecting a laser apparatus from overheating which can result when the laser beam fails while the flash lamps continue to pump the laser crystal. The apparatus and method permit a laser apparatus to have a controlled shut-down when lasing ceases due to a laser defect. Moreover, the disclosed laser apparatus and method avoid the necessity of continued laser slab crystal refurbishing and the attendant significant expense. In this manner, the number of times that the laser apparatus is out of service is significantly decreased.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:
1. A laser apparatus comprising:
a laser crystal situated within a laser cavity;
an excitation lamp for pumping said crystal to generate a laser beam to project along a desired main path;
first sensing means for sensing cessation of the projection of said laser beam along said desired main path;
second sensing means for sensing the excitation of said excitation lamp; and
extinguishing means, coupled to said excitation lamp and said first and second sensing means, for extinguishing said excitation lamp a predetermined amount of time after the cessation of said laser beam such that damage to said laser apparatus due to overheating is avoided.
2. The laser apparatus of claim 1 wherein said first sensing means comprises a photo-diode.
3. The laser apparatus of claim 1 wherein said second sensing means comprises a photo-diode.
4. The laser apparatus of claim 1 wherein said first sensing means comprises a photo-transistor.
5. The laser apparatus of claim 1 wherein said second sensing means comprises a photo-transistor.
6. A laser apparatus comprising:
a laser crystal situated within a laser cavity;
an excitation lamp for pumping said crystal with pulses of light energy to cause said apparatus to generate a laser beam projecting along a desired main path;
first sensing means for sensing cessation of the projection of said laser beam along said desired main laser beam path;
second sensing means for sensing the continuing excitation of said excitation lamp subsequent to cessation of the projection of said laser beam along said desired main path;
shut-down signal generating means, coupled to said first and second sensing mean, for generating a shut-down signal when the excitation of said excitation lamp continues after a predetermined number of pulses of light energy have been emitted by said lamp subsequent to cessation of the projection of said laser beam along said desired main path; and interrupting means, coupled to said shut-down signal generating means, for interrupting the operation of said excitation lamp to prevent damage to said laser apparatus.

7. The laser apparatus of claim 6 wherein said first sensing means comprises a photo-diode.

8. The laser apparatus of claim 6 wherein said second sensing means comprises a photo-diode.

9. The laser apparatus of claim 6 wherein said first sensing means comprises a photo-transistor.

10. The laser apparatus of claim 6 wherein said second sensing means comprises a photo-transistor.

11. A method of protecting a laser apparatus from damage, said laser apparatus including a laser crystal situated within a laser cavity and further including an excitation lamp for pumping said crystal to generate a laser beam, said method comprising the steps of:

generating, by said apparatus, of a desired main laser beam in response to excitation of said laser crystal by said excitation lamp;

sensing, by said apparatus, of the cessation of said desired main laser beam;

sensing, by said apparatus, of the continuing excitation of said excitation lamp; and extinguishing said excitation lamp a predetermined time interval after the step of sensing has indicated cessation of said laser beam such that damage to said laser apparatus due to overheating is avoided.

12. A method of protecting a laser apparatus from damage, said laser apparatus including a laser crystal situated within a laser cavity and further including an excitation lamp, said method comprising the steps of:

pumping, by said excitation lamp, of said crystal with pulses of light energy to cause said apparatus to generate a desired main laser beam in response thereto;

sensing, by said apparatus, of the cessation of said desired main laser beam;

sensing, by said apparatus, of the continuing excitation of said excitation lamp subsequent to cessation of said desired main laser beam;

generating a shut-down signal when the excitation of said excitation lamp continues after a predetermined number of pulses of light energy have been emitted by said lamp subsequent to cessation of said main laser beam; and interrupting the operation of said excitation lamp in response to said shut-down signal such that damage to said laser due to overheating is avoided.

13. The method of claim 12 wherein said predetermined number pulses includes a plurality of pulses.

14. The method of claim 13 wherein said plurality of pulses includes at least 3 pulses.

* * * * *